US011334808B2

United States Patent
Judy, Jr. et al.

(10) Patent No.: US 11,334,808 B2
(45) Date of Patent: May 17, 2022

(54) USER INTERFACE SYSTEM INCORPORATING ANALYSIS OF USER INTERACTION CLASSIFICATION

(71) Applicant: TD Ameritrade IP Company, Inc., Omaha, NE (US)

(72) Inventors: Richard Douglas Judy, Jr., Sykesville, MD (US); Rajesh Badu Devabhaktuni, Dallas, TX (US); Aaron Andrew Blomberg, Bennington, NE (US); Shruthi Polasani, Elliot City, MD (US); Adrian Alan Hooper, Smyrna, TN (US)

(73) Assignee: TD Ameritrade IP Company, Inc., Omaha, NE (US)

( * ) Notice: Subject to any disclaimer, the term of this patent is extended or adjusted under 35 U.S.C. 154(b) by 89 days.

(21) Appl. No.: 16/586,759

(22) Filed: Sep. 27, 2019

(65) Prior Publication Data

US 2021/0097414 A1 Apr. 1, 2021

(51) Int. Cl.
*G06F 3/048* (2013.01)
*G06N 5/04* (2006.01)
*H04L 29/06* (2006.01)
*G06F 9/451* (2018.01)
*G06F 16/28* (2019.01)

(52) U.S. Cl.
CPC ............ *G06N 5/046* (2013.01); *G06F 9/451* (2018.02); *G06F 16/285* (2019.01); *H04L 63/0853* (2013.01)

(58) Field of Classification Search
CPC ....... G06N 5/046; G06F 9/451; G06F 16/285; H04L 63/0853
See application file for complete search history.

(56) References Cited

U.S. PATENT DOCUMENTS

| 2011/0112981 | A1* | 5/2011 | Park | G06Q 30/0282 |
| | | | | 705/347 |
| 2014/0344709 | A1* | 11/2014 | Roberts | H04L 12/1859 |
| | | | | 715/752 |
| 2016/0171540 | A1* | 6/2016 | Mangipudi | G06Q 30/0255 |
| | | | | 705/14.53 |
| 2017/0177718 | A1* | 6/2017 | Loganathan | G06F 16/78 |
| 2019/0362222 | A1* | 11/2019 | Chen | G06N 20/00 |
| 2021/0051015 | A1* | 2/2021 | Widmann | G06K 9/6264 |

* cited by examiner

*Primary Examiner* — Aleksey Olshannikov
(74) *Attorney, Agent, or Firm* — Harness, Dickey & Pierce, P.L.C.

(57) ABSTRACT

A classification system includes a processor and a memory that stores an initial dataset, an analyzed dataset, a model rules database, and instructions. The instructions, in response to receiving first interaction data corresponding to a first interaction, store the first interaction data in the initial dataset as a first entry. The instructions include, at a predetermined time, selecting a set of entries from the initial dataset including the first entry and obtaining a set of analysis rules from the model rules database. The instructions include, for each selected set of entries, calculating an additional parameter based on the obtained set of analysis rules and generating a first analyzed dataset corresponding to the obtained set of analysis rules. The instructions include storing the first analyzed dataset and providing the first analyzed dataset to determine a recommendation using the first analyzed dataset and displaying the recommendation on a user interface.

20 Claims, 6 Drawing Sheets

| ID | Account ID | Selected Content | Type | Time | Page Click Received |
|---|---|---|---|---|---|
| 1 | [unknown] | Video # 23 | Play | 09:23:31 | Article # 45 |
| 2 | 123 | Article # 89 | Open | 09:25:01 | Login Homepage |
| 3 | 234 | Expand Recent Transactions | Trade viewing | 09:31:27 | Account Summary |
| 1 | [unknown] | Video # 23 | Exit | 09:31:31 | Article # 45 |
| 3 | 234 | Recent Transactions | Logout | 09:47:27 | Account Summary |

USER INTERFACE SYSTEM INCORPORATING ANALYSIS OF USER INTERACTION CLASSIFICATION

FIELD

The present disclosure relates to systems and methods for computer-generated user interfaces and more particularly to user interfaces transformed according to outputs of machine learning.

BACKGROUND

Collecting digital data on how clients interact with services is important to understanding how clients use services, allowing the identification of pain points to improve the client experience. The combination of user interaction information would be useful as a centralized database to allow for deeper analytic views and consistent insight into how clients interact with multiple platforms.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An interaction classification system includes a processor and a memory coupled to the processor. The memory stores an initial dataset including initial entries. Each initial entry corresponds to an interaction performed by a user on a webpage. The memory stores an analyzed dataset including analyzed entries. Each analyzed entry corresponds to a selected interaction performed by a user on a webpage. The memory stores a model rules database including selection rules for the analyzed dataset to select initial entries of the initial dataset and analysis rules to analyze the selected initial entries of the initial dataset.

The memory stores instructions that, upon execution, cause the processor to, in response to receiving first interaction data corresponding to a first interaction, store the first interaction data in the initial dataset as a first entry. The instructions include, at a predetermined time, selecting a set of entries from the initial dataset including the first entry and obtaining a set of analysis rules from the model rules database. For each of the selected set of entries, the instructions include calculating an additional parameter using the first interaction data and based on the obtained set of analysis rules and generating a first analyzed dataset corresponding to the obtained set of analysis rules including a portion of the first interaction data and calculated additional parameters. The instructions include storing the first analyzed dataset and providing, to a system implementing a first predictive model, the first analyzed dataset to determine a recommendation using the first analyzed dataset. The first predictive model corresponds to the set of analysis rules. The instructions include displaying the recommendation on a user interface.

In other features, the instructions, upon execution, cause the processor to sort the first analyzed dataset based on an organization parameter included in the set of analysis rules. In other features, the portion of the first interaction data included in the first analyzed dataset is indicated in the set of analysis rules. In other features, the memory stores a user identification database including, for each known user, an account identifier and a corresponding unique identifier.

In other features, the instructions, upon execution, cause the processor to, in response to the first entry excluding a first account identifier, select a first unique identifier included in the first entry. The instructions include comparing the first unique identifier with a set of unique identifiers corresponding to a set of account identifiers stored in the user identification database. The instructions include, in response to the first unique identifier matching one of the unique identifiers of the set of unique identifiers, updating the first entry with a corresponding account identifier associated with the matching one of the unique identifiers.

In other features, the memory stores an authentication database including authentication tokens for each account identifier. In response to the first interaction, the instructions, upon execution, cause the processor to obtain first authentication tokens for a first account identifier included in the first interaction data. In response to the first authentication tokens not matching the first account identifier, the instructions include discarding the first interaction data and, in response to the first authentication tokens matching the first account identifier, storing the first interaction data in the initial dataset.

In other features, the instructions, upon execution, cause the processor to, truncate parameters of the first entry to match a normalized format. In other features, at least one real-time model is configured to obtain a set of entries from the initial dataset to indicate a first recommendation to display to a first user performing the first interaction. In other features, each entry stored in the initial dataset that corresponds to an interaction includes: (i) a unique identifier, (ii) an account identifier, (iii) an indication of content interacted with, (iv) a type of interaction, (v) a timestamp, and (vi) a webpage on which the interaction was performed.

In other features, the type of interaction includes (i) a result of the interaction, including playing a video on the webpage, stopping the video on the webpage, opening the webpage, exiting the webpage, and viewing additional content on the webpage; and (ii) a method of performing the interaction, including a click event and a scroll event. In other features, the user interface is associated with at least one of: (i) a user device and (ii) an analyst device.

An interaction classification method includes, in response to receiving first interaction data corresponding to a first interaction, storing the first interaction data in an initial dataset as a first entry. The initial dataset includes initial entries, and each initial entry corresponds to an interaction performed by a user on a webpage. The method includes at a predetermined time, selecting a set of entries from the initial dataset including the first entry. The method includes obtaining a set of analysis rules from a model rules database to generate an analyzed dataset. The analyzed dataset includes analyzed entries. Each analyzed entry corresponds to a selected interaction performed by a user on a webpage. The model rules database includes selection rules for the analyzed dataset to select initial entries of the initial dataset and analysis rules to analyze the selected initial entries of the initial dataset.

The method includes, for each of the selected set of entries, calculating an additional parameter using the first interaction data and based on the obtained set of analysis rules. The method includes generating a first analyzed dataset corresponding to the obtained set of analysis rules including a portion of the first interaction data and calculated additional parameters. The method includes storing the first analyzed dataset and providing, to a system implementing a first predictive model, the first analyzed dataset to determine a recommendation using the first analyzed dataset. The first predictive model corresponds to the set of analysis rules. The method includes displaying the recommendation on a user interface.

In other features, the method includes sorting the first analyzed dataset based on an organization parameter included in the set of analysis rules. In other features, the portion of the first interaction data included in the first analyzed dataset is indicated in the set of analysis rules. In other features, the method includes storing a user identification database including, for each known user, an account identifier and a corresponding unique identifier.

In other features, the method includes, in response to the first entry excluding a first account identifier, selecting a first unique identifier included in the first entry and comparing the first unique identifier with a set of unique identifiers corresponding to a set of account identifiers stored in the user identification database. The method includes, in response to the first unique identifier matching one of the unique identifiers of the set of unique identifiers, updating the first entry with a corresponding account identifier associated with the matching one of the unique identifiers.

In other features, the method includes storing an authentication database including authentication tokens for each account identifier. The method includes, in response to the first interaction, obtaining first authentication tokens for a first account identifier included in the first interaction data. The method includes, in response to the first authentication tokens not matching the first account identifier, discarding the first interaction data and, in response to the first authentication tokens matching the first account identifier, storing the first interaction data in the initial dataset.

In other features, the method includes truncating parameters of the first entry to match a normalized format. In other features, the method includes obtaining, by at least one real-time model, a set of entries from the initial dataset to indicate a first recommendation to display to a first user performing the first interaction.

In other features, each entry stored in the initial dataset that corresponds to an interaction includes: (i) a unique identifier, (ii) an account identifier, (iii) an indication of content interacted with, (iv) a type of interaction, (v) a timestamp, and (vi) a webpage on which the interaction was performed.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

An interaction classification system generates a centralized index of user interaction data for a plurality of predictive models as well as real-time models. The interaction classification system monitors user interactions on an entity's online systems and services. The interaction classification system receives, for example, website interactions in the form of clicks on a webpage. Each interaction is logged along with a set of interaction data parameters. The interaction data parameters include a unique identifier along with a corresponding user account identifier if the user is logged in to a user account the user has with the entity. Otherwise, the interaction classification system will monitor user webpage interactions according to unique identifiers, such as the user's Browser and/or device identifier.

In various implementations, the interaction classification system compares entries of the index or dataset to match interactions of unknown users with interactions with known users. That is, if a particular user interacted with an entity webpage while logged out of their account and interacted with the entity webpage while logged in to their account using the same Browser, the interaction classification system will match the interactions of the unknown user to the known user's account. Then, the interaction classification system updates the entries of the dataset of the unknown user with the known user's account identifier, such as an account number. The interaction classification system performs such a comparison at predetermined intervals, such as daily.

The interaction classification system generates two indices: (i) an initial dataset and (ii) an analyzed dataset. The initial dataset includes raw data including interaction data for each user interaction. The interaction data is added as an entry to the initial dataset in response to a user interaction being performed, such as a click event or a scroll event. The initial dataset includes interactions from both known users (logged in users or users with an account and known Browser/device) and unknown users. Each entry of the initial dataset includes interaction data parameters, such as (i) a unique identifier, (ii) a user account identifier, (iii) content interacted with, (iv) interaction type, (v) a timestamp, (vi) a page on which the interaction was performed, etc.

Each entry of the initial dataset is added once the interaction occurs; therefore, further analysis and organization of the initial dataset is not performed and included in the initial dataset. The real-time models, mentioned previously, can be provided raw data from the initial dataset to analyze and use in real-time and influence or adjust recommendations of the real-time models. The real-time model and predictive model recommendations may include user identifiers of users that may be a fit for content presentation or may indicate fraud. The recommendations may be presented to the user as an alert or an entity analyst as a user identifier. The recommendations may also include content consumption recommendations. Each recommendation is a result of the purpose of the model.

For example, systems implementing the real-time models may operate more efficiently by accessing the raw data from the initial dataset to provide real-time content recommendations. That is, a content recommendation system may implement a real-time model and access the raw data in real-time to determine what content a particular user is consuming. Then, the content recommendation system can obtain user interaction data and analyze the user interaction data to identify content recently consumed (for example, within the hour) by the user to display recommendations on a webpage that are more accurate or more similar to recently viewed content.

The analyzed dataset is created based on the initial dataset. In various implementations, the interaction classification system creates multiple analyzed datasets according to multiple sets of analysis and organization rules or model rules. The analyzed datasets are generated to provide information used by particular predictive models and/or are organized according to a preferred format of the particular predictive models.

For example, analysis and organization rules for a particular predictive model may include calculating a viewing duration of pages. To perform such a calculation, the interaction classification system includes identifying, within the initial dataset, a selection resulting in the direction to a particular page and a selection, by the same user, on the particular page directing the user to a different page. Then, the timestamp of both entries is obtained and the difference is calculated to determine how long the user remained on the particular page. In this way, a predictive model can be configured to determine an average amount of time spent by users viewing articles, an account summary, particular videos, etc.

In various implementations, analysis and organization rules for a particular model may exclude from the generated analyzed datasets columns or entries included in the initial dataset that are irrelevant to certain systems implementing predictive models. For example, certain systems implementing predictive models may only monitor interactions and behavior of users with a user account associated with the entity. Therefore, the analysis and organization rules may exclude all entries for interactions of unknown users.

Figure 1:
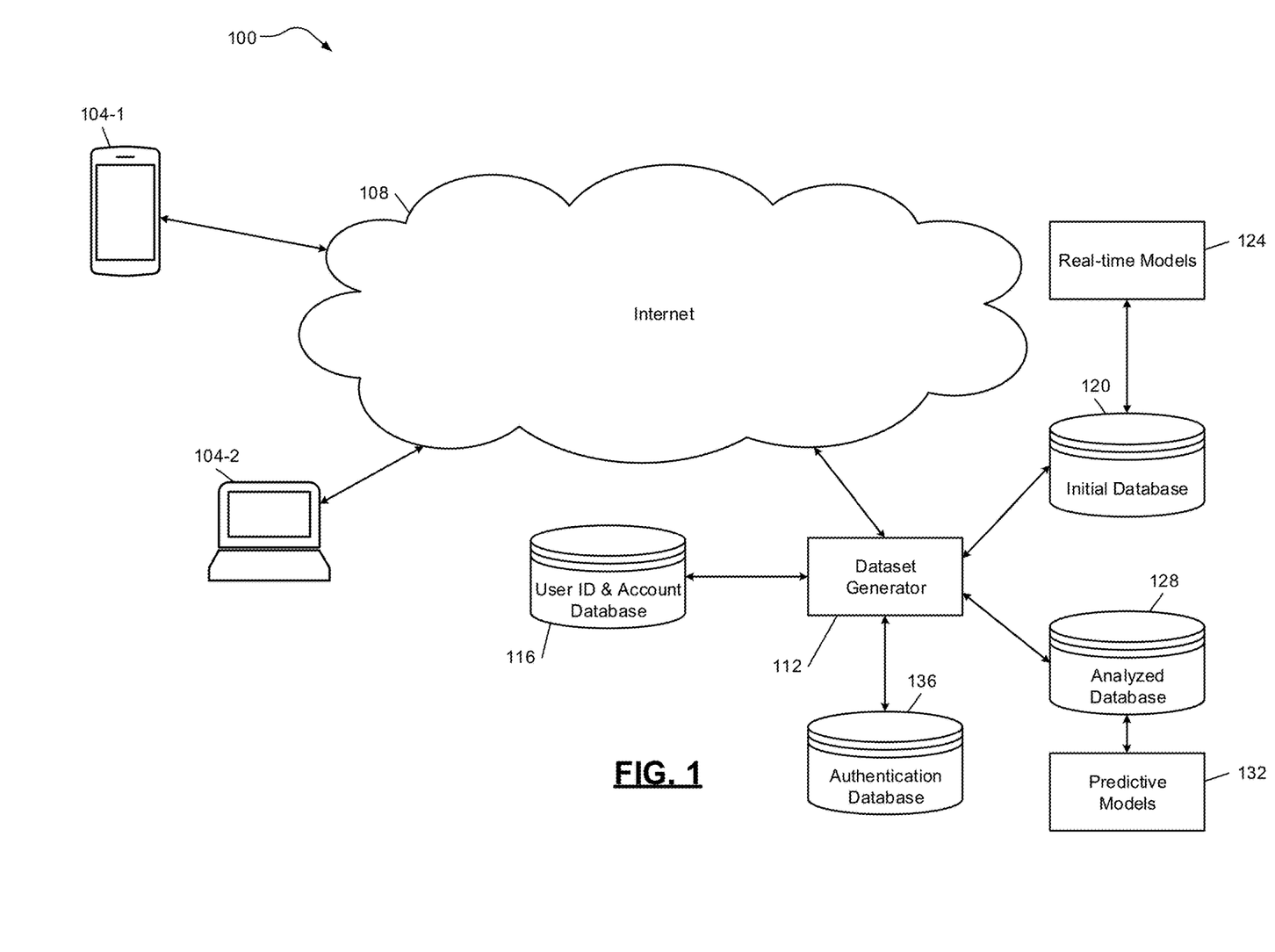
FIG. 1 is a high-level example block diagram of a network communication system including an interaction classification system according to principles of the present disclosure.

FIG. 1 is a high-level example block diagram of a network communication system including an interaction classification system 100 according to principles of the present disclosure. A first user device 104-1 and a second user device 104-2 may be used to access a particular user's account or a webpage via the Internet 108. The webpage may be associated with an entity generating datasets based on interactions performed by a user on the webpage. A dataset generator 112 can access a user ID and account database 116. The dataset generator 112 can access account parameters of known users interacting with entity webpages from the user ID and account database 116. Each time a user interacts with a webpage associated with the entity, the dataset generator 112 stores interaction data of the interaction in an initial database 120. The initial database 120 includes raw data describing each interaction as entries in an initial dataset. Systems implementing real-time models 124 can communicate with the dataset generator 112 to access or obtain the initial dataset.

An analyzed database 128 stores analyzed datasets. The dataset generator 112 stores raw data in the initial database 120 and, at predetermined intervals, obtains the stored raw data from the initial database 120 to analyze and organize the interaction data entries according to model rules associated with predictive models 132. Systems implementing the predictive models 132 access or obtain analyzed data from the analyzed database 128 for further analysis. For example, a predictive model may include machine-learning methods to identify users that may be interested in using a particular program or platform.

These machine-learning methods analyze the historical interactions users have with webpages associated with the entity and, based on additional parameters, such as account parameters including account size, account type, investments, etc., identify whether a particular user may be interested in using the particular program for advanced investments. Using the analyzed dataset, the example predictive model may indicate to a corresponding system to present the program for advance investments to the user on a user interface of user devices 104-1 and 104-2 or display a user identifier to an analyst. Then, the analyst may contact the user to provide the user with information about the program from which the user may benefit.

Systems implementing the predictive models 132 may tailor their further analyses to the analyzed datasets according to a type of recommendation the system is producing. Further, the dataset generator 112 may include a set of model or analysis and organization rules that are tailored to a particular predictive model, such as calculating a viewing duration of a video or page using timestamp information stored in the datasets.

The dataset generator 112 also communicates with an authentication database 136 to verify the interactions received from known users logged in to an account associated with the entity hosting the webpage. Throughout the present application, the webpage being described may be hosted by an entity, such as a financial institution, that provides a variety of platforms hosting account management features, educational content, informational content, etc. The authentication database 136 may be accessed to verify tokens during user interactions with webpages. By only storing interaction data of interactions performed by unknown users not logged in and verified known users logged in, the dataset generator 112 excludes data that may be false. The dataset generator 112 can access the user ID and account database 116, the initial database 120, the analyzed database 128, and the authentication database 136 via the Internet 108 or via an internal network connection to monitor and classify interaction data.

Figure 2:
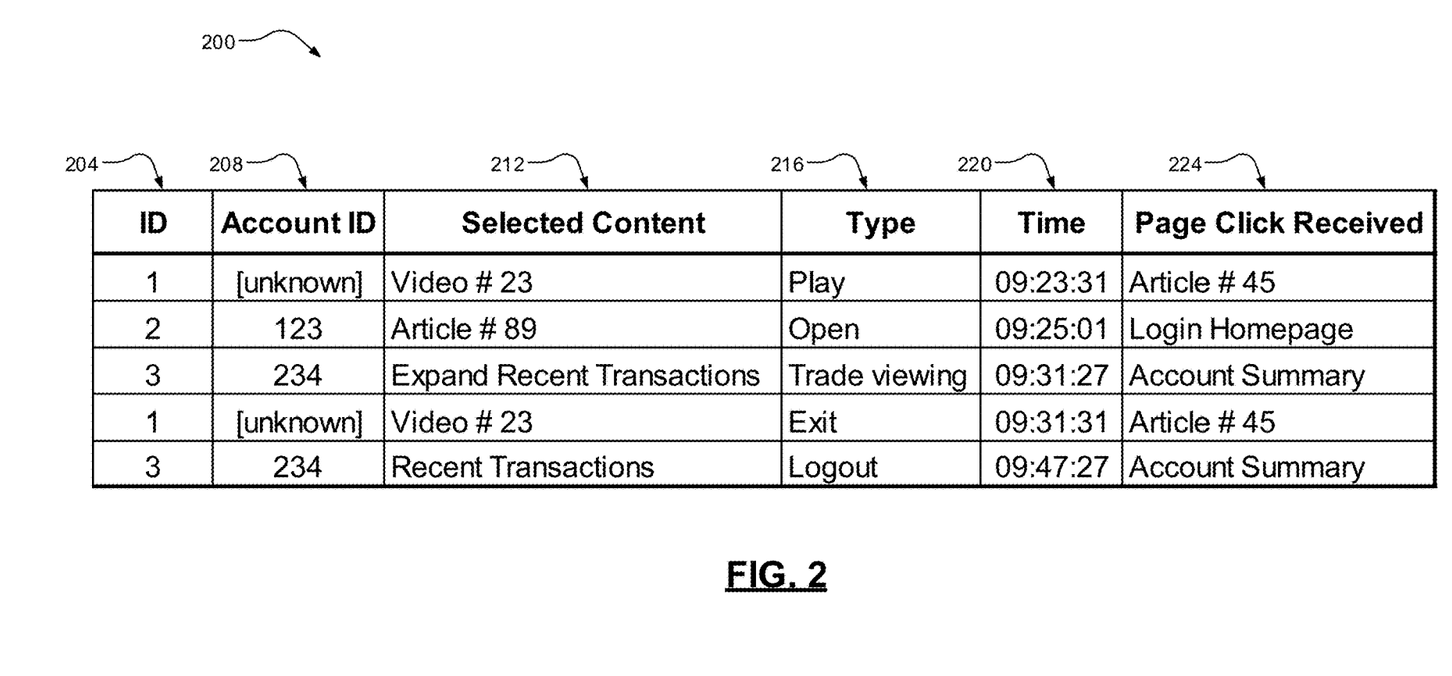
FIG. 2 is a representation of an example analyzed dataset according to the principles of the present disclosure.

FIG. 2 is a representation of an example analyzed dataset according to the principles of the present disclosure. An example analyzed dataset 200 includes interaction data, such as a unique ID 204, an account ID 208, content selected 212, a type of content 216, a timestamp 220, and a webpage where an interaction is performed 224. The interaction data may further include parameters such as a client ID, a duration of viewing, a device type, etc.

As described previously, an initial dataset includes raw data, for example, URLs in columns 212 and 224 instead of a title of where the URL directs a webpage. After being analyzed according to a set of analysis and organization rules, the analyzed dataset 200 converts URLs into corresponding titles and may organize the dataset based on the analysis and organization rules. In various implementations, the analyzed dataset 200 may sort according to unique ID 204, account ID 208, etc.

Additionally, the analyzed dataset 200 may exclude unknown user interaction data. As shown in the analyzed dataset 200, unknown user entries do not have an account ID; however, unknown user entries maintain the same unique ID 204. In this way, the interaction classification system can monitor unknown user activity. For example, unique ID 1 is an unknown user, but, from the analyzed dataset 200, it is shown that the unknown user selected to play Video #23 from a webpage displaying Article #45 at 9:23:31 AM. Then, at 9:31:31 AM, the same unknown user exited Video #23, which is played from the webpage displaying Article #45.

Therefore, when a system implementing a predictive model accesses the analyzed dataset 200, the system may calculate that the unknown user watched Video #23 for eight minutes and the calculated information may be used by the predictive model for further analyses. In various implementations, the analysis and organization rules may also include rules directed to generating, for users interacting with videos, a table indicating how long each video was consumed by the viewing user. Additionally, the interaction classification system may access a video database (not shown) including runtimes of videos to calculate a percentage of the video that was viewed.

In another example, unique ID 3 with account ID 234 selected to expand recent transactions from their account summary page at 9:31:27 AM. The type of interaction was to view their recent trading. Then, at 9:47:27, unique ID 3 selected to logout from their recent transactions by selecting a log out icon on their account summary page. Systems implementing predictive models can calculate that this user viewed their recent transactions page for 16 minutes. Depending on the predictive model, the user's behavior can be compared to viewing history of other users. A length of viewing may indicate, based on the predictive model analysis, that the user with unique ID 3 is contemplating making a trade and, based on the monitoring of the user's interactions, the interaction classification system can identify the user and present educational trade information to that user on the user interface of user device 104-1 or 104-2 or direct an analyst to contact the user included in a recommendation presented to the analyst.

Figure 3:
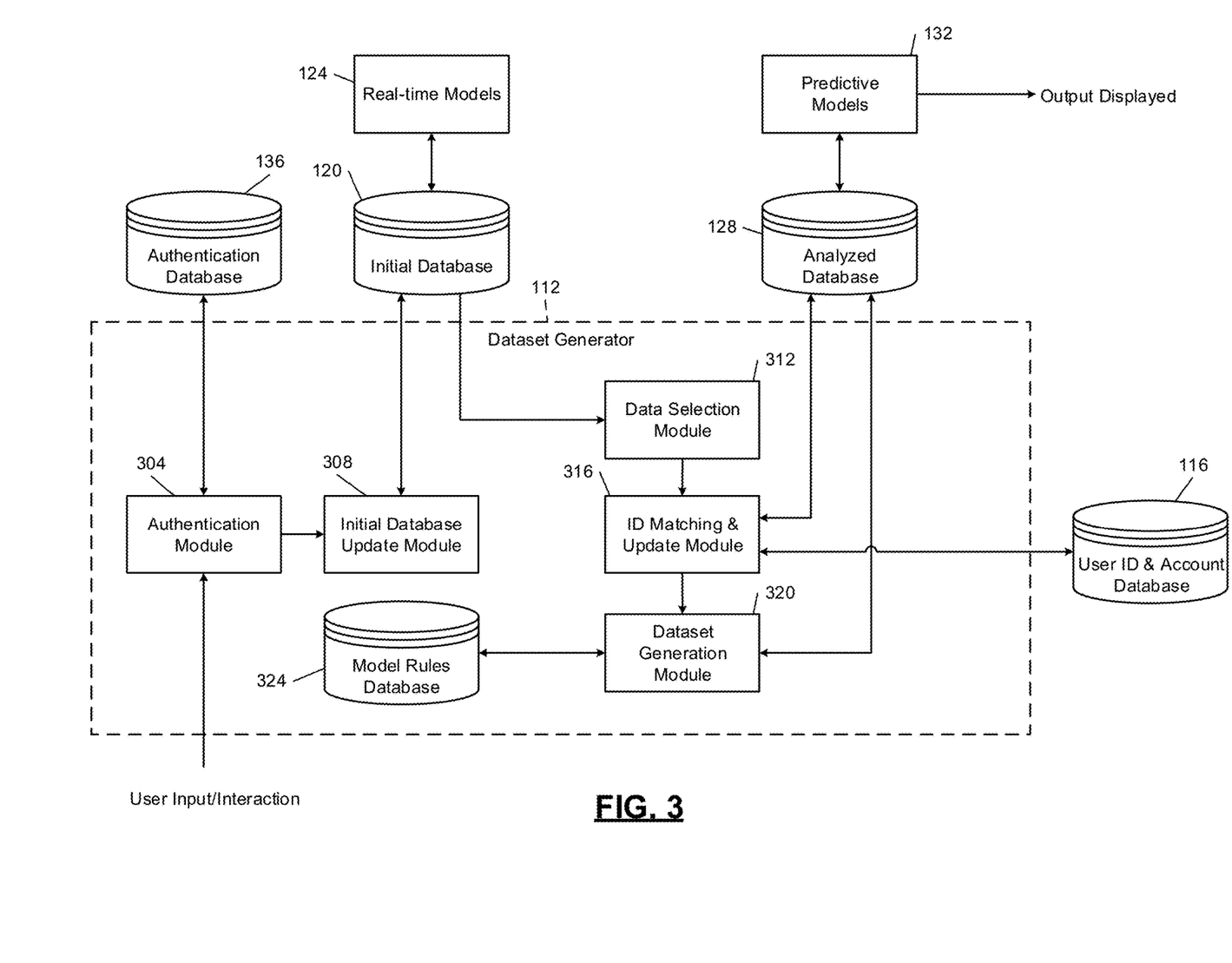
FIG. 3 is a functional block diagram of an example dataset generator within an interaction classification system according to principles of the present disclosure.

FIG. 3 is a functional block diagram of an example dataset generator within an interaction classification system according to principles of the present disclosure. The dataset generator 112 includes an authentication module 304 that receives user input/interactions, for example, a click on a webpage. The authentication module 304 operates to confirm that a logged in user is performing the received interaction data. For example, when an interaction is performed, data relating to the interaction is stored in the initial database 120. If the interaction is performed by an unknown user, meaning that the user is not logged in to an account, the authentication module 304 does not authenticate the interaction and data from the interaction is forwarded to an initial database update module 308 for storage in the initial database 120.

Alternatively, if the interaction is performed by a known user who is logged in to their account, for example, with a financial institution, the authentication module 304 authenticates the user. In various implementations, the authentication module 304 compares the user's account identifier (identifying the user) against authentication tokens for the user stored in the authentication database 136 to confirm the received interaction is performed by the logged in user. Once verified, the interaction data is transmitted to the initial database update module 308 for storage in the initial database 120. Otherwise, the interaction data is not retained since the user performing the interaction cannot be confirmed.

The initial database 120 stores the initial dataset. The initial dataset includes a plurality of entries of interaction data for each interaction that is monitored. The initial dataset includes raw data before any converting, cleaning, or organizing has been performed. A system implementing the real-time models 124 can access the initial database 120. Once data from the initial database 120 is provided, the real-time models 124 can analyze and learn from the raw data of the initial dataset in real-time. For example, a real-time model may be implemented by a recommendation engine that provides video recommendations based on the user's viewing history. Therefore, the recommendation engine is improved when the user's viewing history is updated in real-time. Systems implementing real-time models 124 may include converting, cleaning, and organizing modules as needed. In various implementations, systems implementing the real-time models 124 select which entries or which columns to obtain so that only the necessary or relevant interaction data is collected and analyzed.

In various implementations, interaction data is immediately stored in a intermediate database. In such implementations, the authentication module 304 and initial database update module 308 obtain interaction data at predetermined intervals, for example, hourly, to authenticate and update the initial database 120 with new interaction data.

At predetermined intervals, for example, daily, a data selection module 312 of the dataset generator 112 obtains a set of interaction data entries from the initial database 120 for analysis. In various implementations, the data selection module 312 obtains all data in the initial database 120 for analysis. Alternatively, the data selection module 312 may be configured to select only a subset of entries included in the initial database 120, such as interaction data from interactions performed within the last 30 days. Additionally, the initial database 120 may delete all data that is older than 90 days to eliminate continued analysis of older data.

Once obtained by the data selection module 312, an ID matching and update module 316 selects the interaction data performed by unknown users. The ID matching and update module 316 compares the unique ID of unknown users to the unique ID of known users stored in the user ID and account database 116. In various implementations, the authentication tokens stored in the authentication database 136 may be stored in the user ID and account database 116. If the ID matching and update module 316 matches the unique ID of an unknown user to the unique ID of a known user, then the interaction data entries excluding the account ID associated with the unique ID are updated to include the account ID as the user is now known. In various implementations, the ID matching and update module 316 intermittently compares the analyzed datasets in the analyzed database 128 to the user ID and account database 116 to identify any new matches among the unique IDs. Since a match can only occur once the user logs in to their account by identification of a matching unique ID, for example, by logging on using the same Browser, the analyzed datasets may need to be updated after being generated.

In various implementations, the ID matching and update module 316 can update the user ID and account database 116 with unique IDs excluded from the user ID and account database 116. That is, if a user logs in to their account from a new Browser, the user ID and account database 116 associates the user account ID with a new unique ID assigned to the Browser, indicating that the user may access webpages from the same Browser (interactions having the same unique ID) without being logged in.

If the same Browser and/or devices are associated with multiple accounts (meaning that users having different account IDs logged in from the same Browser and/or same device), then the ID matching and update module 316 does not presume to know an unknown user interacting with webpages on the same Browser/device, leaving the unknown user as unknown. In various implementations, the ID matching and update module 316 may add a new column to the datasets indicating interactions are received from the same Browser and/or device, tracking interactions from, potentially, the same household or unit.

The updated dataset is then transmitted to a dataset generation module 320 that prepares analyzed datasets according to analysis and organizational rules included in a model rules database 324. The model rules database 324 includes dataset generation rules according to predictive models 132. For example, a set of model rules may include converting entries of interaction data into a normalized format, such as converting URLs into an end portion of the URL that indicates a title or sufficient webpage information. Additionally, the set of model rules may include determining a viewing duration of each interaction for videos and webpages. Additionally, the set of model rules may also include factors similar to determining whether the user selected to speak with a representative from the help page.

The dataset generation module 320 may generate multiple datasets, for example, one analyzed dataset for each predictive model or multiple datasets for each predictive model, based on the sets of rules included in the model rules database 324. The sets of rules may also include sorting and filtering rules. For example, for a particular predictive model, unknown users may be irrelevant or excluded. Therefore, the dataset generation module 320 removes the interaction data for interactions performed by an unknown user. Additionally, a set of rules may dictate that the dataset generation module 320 organizes the entries according to unique ID or account ID so that interaction data is grouped by user. Further, some predictive models may use data on an individual or client level. Therefore, the set of rules may filter out certain clients and organize interaction data based on client.

The model rules database 324 may also include rules tailored to the directive of the associated predictive model. For example, if a system implementing a predictive model is comparing a duration a user remains on a help page to the average duration on the help page over the last 90 days, the respective set of rules may sort the interaction data entries based on length, calculate an average length, and highlight the average duration in the analyzed dataset. Then, the corresponding system implementing the predictive model may generate an alert or indication on an analyst display including or recommending those users who remained on the help page for twice the average duration and did not select to contact a representative. For the identified or recommended users, the analyst may be instructed to reach out to those users with an account ID or the system implementing the predictive model may generate a message and automatically transmit the message to those users who remained on the help page for twice the average duration.

Additionally, the system implementing the predictive model may track which sections of the help page users were viewing more frequently to provide feedback regarding which issues may be the most prevalent or which issues most often cause a user to search the help page. The goal of the system implementing the predictive model may be to attempt to identify help page issues facing users to generate an alert to an analyst on a user interface of an analyst device to indicate areas of webpage improvement. The generated analyzed datasets are stored in the analyzed database 128. Systems implementing predictive models 132 can access the analyzed datasets from the analyzed database 128, selecting portions of the analyzed datasets or an entirety of the analyzed datasets.

The dataset generation module 320 also generates a single analyzed dataset that is normalized and formatted to include each interaction data entry. The system implementing predictive models 132 can obtain specifically generated analyzed datasets that include calculated values (for example, viewing duration) and/or can select columns or entries from the single analyzed dataset including all interaction data.

In various implementations, an analyst can generate reports based on data stored in the initial database 120 and the analyzed database 128. These reports can also be generated within predictive models to generate insights into interactions that can direct future enhancements for user interactions.

Figure 4:
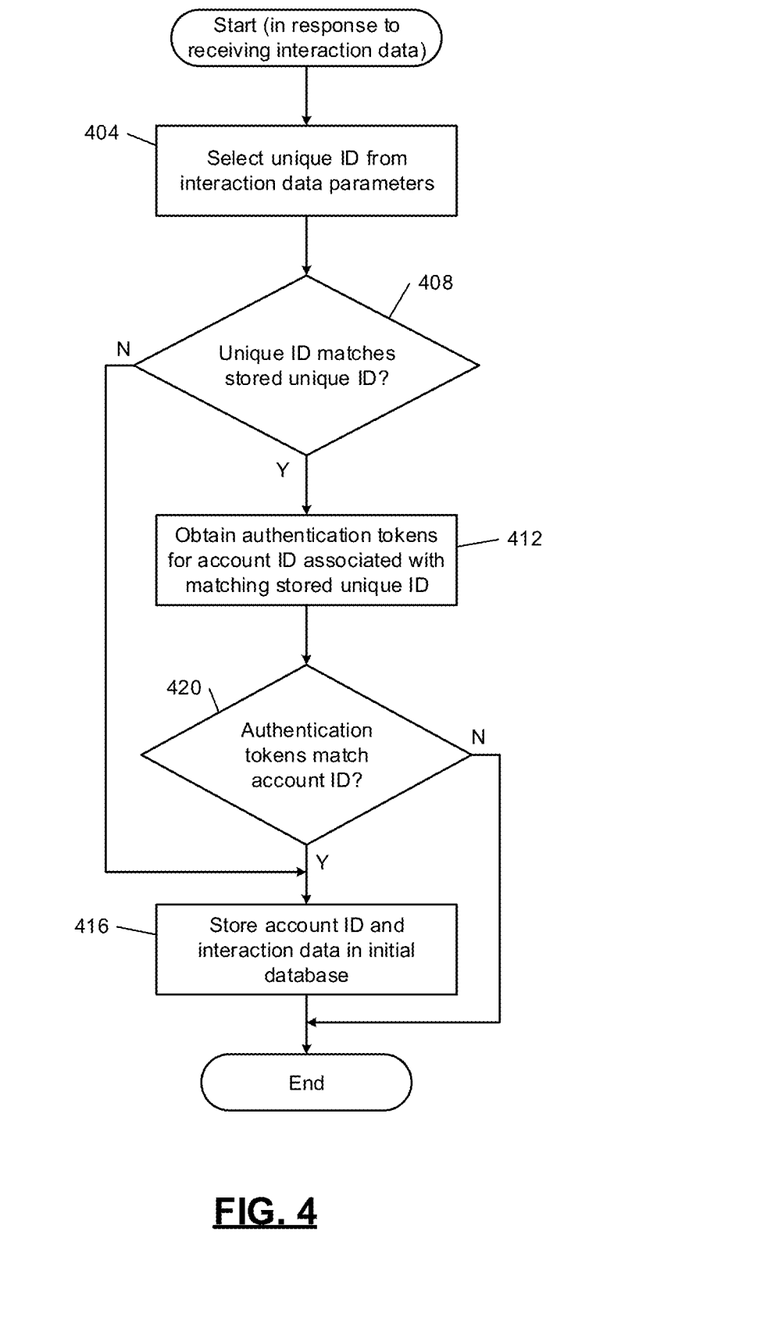
FIG. 4 is a flowchart depicting example storing of interaction data in an initial database according to the principles of the present disclosure

Referring now to FIG. 4, a flowchart depicting example storing of interaction data in an initial database according to the principles of the present disclosure is shown. Control begins in response to receiving interaction data. As described previously, control may also begin at specified intervals, for example, every hour. At 404, control selects a unique ID from the interaction data parameters of the received interaction data. At 408, control determines whether the selected unique ID matches a stored unique ID. A database stores account IDs along with associated unique IDs. If yes, control continues to 412 to obtain authentication tokens for account ID associated with the matching stored unique ID. Otherwise, control proceeds to 416 to store interaction data parameters in the initial database, leaving the account ID parameter empty or with the placeholder "unknown." At 420, control determines whether the authentication tokens obtained match the account identifier to confirm the account holder is interacting with the webpage. If yes, control continues to 416 to store the account ID and interaction data in the initial database. Otherwise, when the interaction data cannot be verified, control ends, excluding the interaction data from the initial database.

Figure 5:
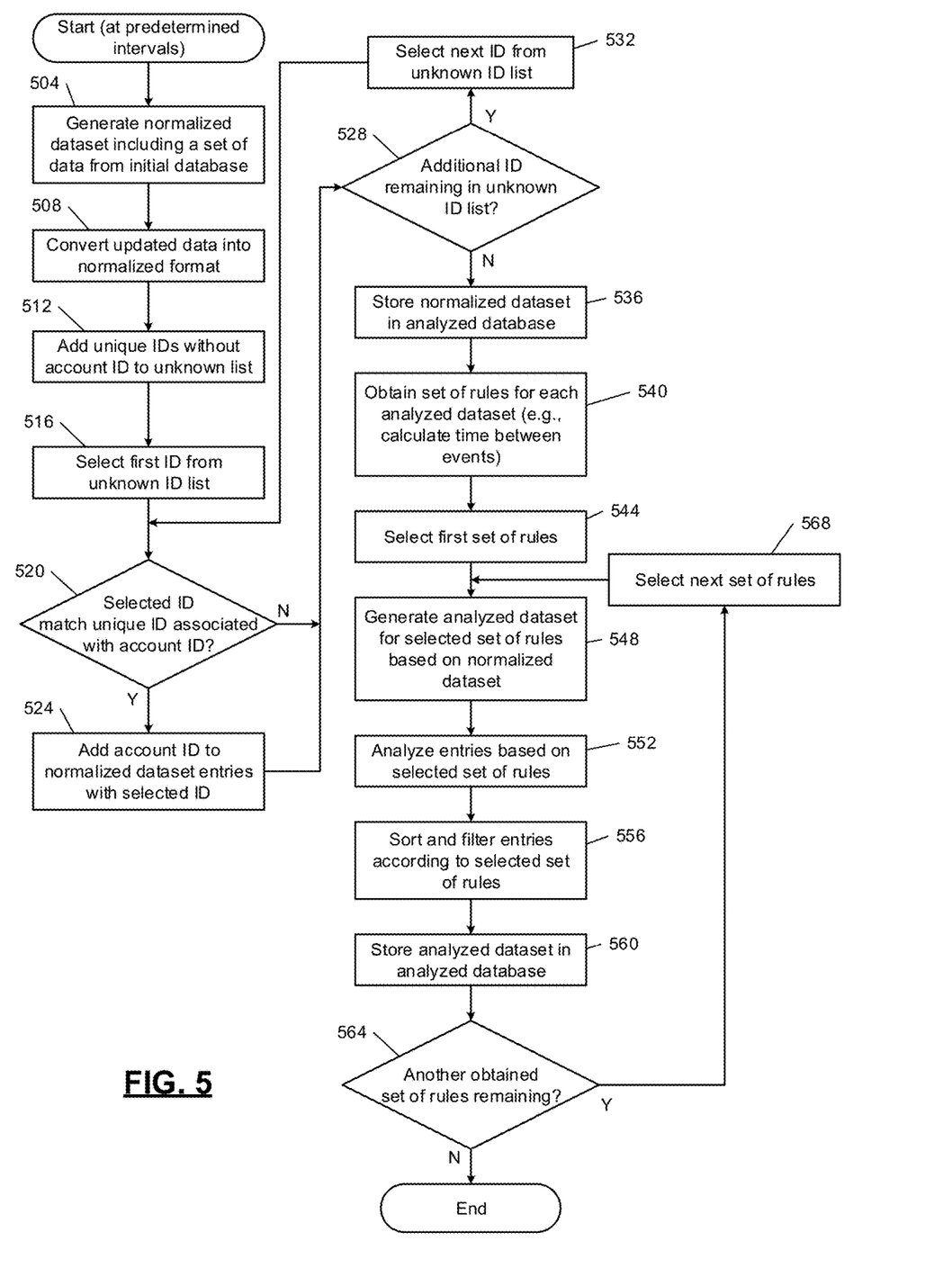
FIG. 5 is a flowchart depicting example generating analyzed datasets by classifying interactions within an interaction classification system according to the principles of the present disclosure.

FIG. 5 is a flowchart depicting example generating analyzed datasets by classifying interactions within an interaction classification system according to the principles of the present disclosure. Control begins at reoccurring, predetermined intervals, such as daily intervals, to analyze initial datasets and store the analyzed datasets in the analyzed database. As discussed above, systems implementing predictive models can access the analyzed datasets for use in data analysis for recommendations, fraud detection, etc. At 504, control generates a normalized dataset including a set of data from the initial dataset stored in the initial database. The set of data selected may be all interaction data entries from the initial dataset or a portion of entries, for example, including entries from the last 30 days.

At 508, control converts the set of data into a normalized format, for example, by truncating URLs. Control continues to 512 to add unique IDs from the normalized dataset that do not have an associated account number to an unknown list. At 516, control selects the first ID from the unknown list. At 520, control determines if the selected ID matches a unique ID associated with an account ID that is stored in a user ID and account ID database. If the selected ID matches a unique ID associated with an account ID, then a user with the account ID has previously used the same device and/or Browser to interact with the webpage.

Therefore, at 524, control adds the account ID to the normalized dataset entries with the selected ID listed as the unique ID and continues to 528. Otherwise, control continues directly to 528 to determine if another unknown ID is included in the unknown ID list. If yes, at 532, control selects the next unknown ID from the unknown ID list and returns to 520. Otherwise, control proceeds to 536 to store the normalized dataset in the analyzed database. As mentioned above, the normalized dataset includes all entries to produce a single analyzed dataset that includes all interaction data parameters. In this way, a system implementing a predictive model (or real-time model) can access, or be provided, data from a general dataset that includes all parameters monitored instead of obtaining a personalized dataset.

At 540, control obtains a set of rules for each dataset that is going to be generated. For example, a first dataset may include viewing duration and the corresponding set of rules includes identifying a beginning timestamp and an ending timestamp for all content consumed and calculating the view duration for each content item based on the identified timestamps. In another example, the set of rules may include identifying a transition interaction to determine, for example, from what webpage screen users are most likely to watch videos, how frequently users contact representatives after viewing the help page, etc. For each analyzed dataset that is generated, a corresponding set of rules guides what information is included in the dataset. The sets of rules may further dictate whether both known and unknown user interactions are included in the dataset and how the analyzed dataset is organized. For example, the analyzed dataset may be organized by user, by client, by interaction type, by viewing duration, etc.

Control continues to 544 to select a first set of rules from the obtained set of rules. At 548, control generates an analyzed dataset corresponding to the selected set of rules using the interaction data entries of the normalized dataset. At 552, control analyzes the interaction data entries based on the selected set of rules, calculating certain parameters to include in a column generated and added to the analyzed dataset, as described above. At 556, control sorts and filters the entries according to the selected set of rules. At 560, control stores the analyzed dataset in the analyzed database. Control proceeds to 564 to determine if another obtained set of rules is remaining. If yes, control continues to 568 to select the next set of rules and returns to 548. Otherwise, control ends.

Figure 6:
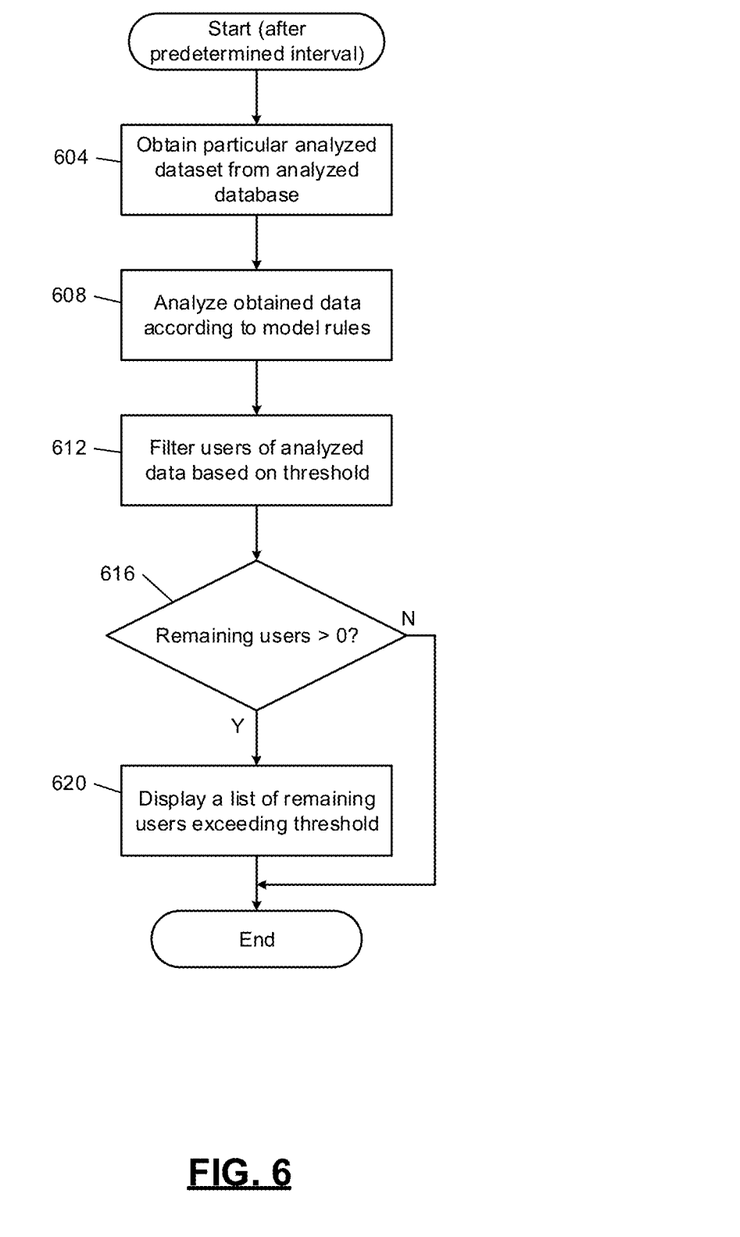
FIG. 6 is a flowchart depicting example analyzing of updated and classified data by a system implementing an example predictive model according to the principles of the present disclosure.

FIG. 6 is a flowchart depicting example analyzing of updated and classified data by a system implementing an example predictive model according to the principles of the present disclosure. A system implementing the example predictive model may intermittently access the analyzed database to retrieve a particular analyzed dataset. Therefore, control begins after a predetermined interval. At 604, control obtains a particular analyzed dataset from the analyzed database. In various implementations, control may obtain particular columns or entries of the normalized dataset.

At 608, control analyzes the obtained entries according to model rules. For example, if the goal of the system implementing the predictive model is to detect fraud, the model rules may monitor a number of transactions of money being transferred into an account. Then, at 612, control filters out users included in the analyzed data based on a threshold value. For example, based on historical data, greater than five transactions per day for three consecutive days may be considered suspicious. Therefore, all accounts not satisfying the above suspicious criteria may be removed from the analyzed data. Then, at 616, control determines, after filtering out users that are not suspicious, if a remaining number of users is greater than zero, meaning the system implementing the predictive model has identified at least one suspicious user. If no, control ends. Otherwise, control continues to 620 to display a list of the remaining users that exceeded the threshold as well as the relevant information that indicate fraud may have occurred in corresponding user accounts.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A classification system comprising:
    a processor; and
    a memory coupled to the processor,
    wherein the memory stores:
        an initial dataset including a plurality of initial entries, wherein each initial entry of the plurality of initial entries corresponds to an interaction performed by a user on a webpage;
        a user identification database including, for each known user, an account identifier and a corresponding unique identifier;
        an authentication database including authentication tokens for each account identifier;
        an analyzed dataset including a plurality of analyzed entries, wherein each analyzed entry of the plurality of analyzed entries corresponds to a selected interaction performed by a user on the webpage;
        a model rules database including selection rules for the analyzed dataset to select initial entries of the initial dataset and analysis rules to analyze the selected initial entries of the initial dataset; and
        instructions that, upon execution, cause the processor to, in response to receiving first interaction data corresponding to a first interaction:
            store the first interaction data in the initial dataset as a first entry;
            select a first unique identifier included in the first entry;
            determine whether the first unique identifier matches one of the unique identifiers of a set of unique identifiers, wherein the set of unique identifiers correspond to a set of account identifiers stored in the user identification database;
            in response to the first unique identifier matching one of the unique identifiers if the set of unique identifiers, obtain, from the authentication database, first authentication tokens for a first account identifier associated with the matching stored unique identifier of the set of unique identifiers;

in response to the first identifier tokens not matching the first account identifier, discard the first interaction data;

in response to the first authentication tokens matching the first account identifier, store the first account identifier and the first interaction data in the initial dataset;

select a set of entries from the initial dataset including the first entry;

obtain a set of analysis rules from the model rules database;

for each of the selected set of entries, generate a first analyzed dataset corresponding to the obtained set of analysis rules, wherein the first analyzed dataset includes a portion of the first interaction data and additional parameters, wherein the additional parameters are calculated using the first interaction data and the obtained set of analysis rules;

store the first analyzed dataset;

provide, to a system implementing a first predictive model, the first analyzed dataset to determine a recommendation using the first analyzed dataset, wherein the first predictive model corresponds to the set of analysis rules; and display the recommendation on a user interface.

2. The system of claim 1 wherein the instructions, upon execution, cause the processor to sort the first analyzed dataset based on an organization parameter included in the set of analysis rules.

3. The system of claim 1 wherein the portion of the first interaction data included in the first analyzed dataset is indicated in the set of analysis rules.

4. The system of claim 1 wherein the instructions, upon execution, cause the processor to, truncate parameters of the first entry to match a normalized format.

5. The system of claim 1 wherein at least one real-time model is configured to obtain a set of entries from the initial dataset to indicate a first recommendation to display to a first user performing the first interaction.

6. The system of claim 1 wherein each entry stored in the initial dataset that corresponds to an interaction includes: an indication of content interacted with, a type of interaction, a timestamp, and a webpage on which the interaction was performed.

7. The system of claim 6 wherein the type of interaction includes (i) a result of the interaction, including playing a video on the webpage, stopping the video on the webpage, opening the webpage, exiting the webpage, and viewing additional content on the webpage; and (ii) a method of performing the interaction, including a click event and a scroll event.

8. The system of claim 1 wherein the user interface is associated with at least one of: (i) a user device and (ii) an analyst device.

9. An interaction classification method comprising:

in response to receiving first interaction data corresponding to a first interaction, storing the first interaction data in an initial dataset as a first entry, wherein the initial dataset includes a plurality of initial entries, and wherein each initial entry of the plurality of initial entries corresponds to an interaction performed by a user on a webpage;

storing a user identification database including, for each known user, an account identifier and a corresponding unique identifier;

selecting a first unique identifier included in the first entry;

determining whether the first unique identifier matches a unique identifier of a set of unique identifiers;

in response to the first unique identifier matching one of the unique identifiers of the set of unique identifiers, obtaining, from an authentication database, first authentication tokens for a first account identifier associated with the matching stored unique identifier of the set of unique identifiers;

in response to the first authentication tokens not matching the first account identifier, discarding the first interaction data;

in response to the first authentication tokens matching the first account identifier, storing the first account identifier and the first interaction data in the initial dataset;

selecting a set of entries from the initial dataset including the first entry;

obtaining a set of analysis rules from a model rules database to generate an analyzed dataset, wherein the analyzed dataset includes a plurality of analyzed entries, wherein each analyzed entry of the plurality of analyzed entries corresponds to a selected interaction performed by the user on the webpage, and wherein the model rules database includes selection rules for the analyzed dataset to select initial entries of the initial dataset and analysis rules to analyze the selected initial entries of the initial dataset;

for each of the selected set of entries, generating a first analyzed dataset corresponding to the obtained set of analysis rules, wherein the first analyzed dataset includes a portion of the first interaction data and additional parameters, wherein the additional parameters are calculated using the first interaction data and the obtained set of analysis rules;

storing the first analyzed dataset;

providing, to a system implementing a first predictive model, the first analyzed dataset to determine a recommendation using the first analyzed dataset, wherein the first predictive model corresponds to the set of analysis rules; and displaying the recommendation on a user interface.

10. The method of claim 9 further comprising sorting the first analyzed dataset based on an organization parameter included in the set of analysis rules.

11. The method of claim 9 wherein the portion of the first interaction data included in the first analyzed dataset is indicated in the set of analysis rules.

12. The method of claim 9 further comprising truncating parameters of the first entry to match a normalized format.

13. The method of claim 9 further comprising obtaining, by at least one real-time model, a set of entries from the initial dataset to indicate a first recommendation to display to a first user performing the first interaction.

14. The method of claim 9 wherein each entry stored in the initial dataset that corresponds to an interaction includes: an indication of content interacted with, a type of interaction, a timestamp, and a webpage on which the interaction was performed.

15. A classification system comprising:

a processor; and a memory coupled to the processor, wherein the memory stores:

a dataset including a plurality of entries, wherein each entry of the plurality of entries corresponds to an interaction performed by a user on a webpage;

a user identification database including, for each known user, an account identifier and a corresponding unique identifier;

an authentication database including an authentication token for each account identifier; and instructions that, upon execution, cause the processor to, in response to receiving interaction data corresponding to an interaction:

select a unique identifier from the received interaction data;

determine whether the selected unique identifier matches a stored unique identifier in the user identification database;

in response to the unique identifier matching a stored unique identifier, obtain from the authentication database the authentication token for the account identifier associated with the matching stored unique identifier;

in response to the obtained authentication token matching the account identifier, store the account identifier and the interaction data in the dataset;

generate an analyzed dataset, wherein the analyzed dataset includes a portion of the interaction data and parameters calculated using the interaction data and a set of rules stored in the memory;

store the analyzed dataset;

provide, to a system implementing a predictive model, the analyzed dataset to determine a recommendation using the analyzed dataset, wherein the predictive model corresponds to the set of rules; and     display the recommendation on a user interface.

16. The system of claim 15 wherein the instructions, upon execution, cause the processor to sort the analyzed dataset based on an organization parameter included in the set of rules.

17. The system of claim 15 wherein at least one real-time model is configured to obtain a set of entries from the dataset to indicate a first recommendation to display to a first user performing the interaction.

18. The system of claim 15 wherein each entry stored in the dataset that corresponds to an interaction includes: an indication of content interacted with, a type of interaction, a timestamp, and a webpage on which the interaction was performed.

19. The system of claim 18 wherein the type of interaction includes (i) a result of the interaction, including playing a video on the webpage, stopping the video on the webpage, opening the webpage, exiting the webpage, and viewing additional content on the webpage; and (ii) a method of performing the interaction, including a click event and a scroll event.

20. The system of claim 15 wherein the user interface is associated with at least one of: (i) a user device and (ii) an analyst device.

\* \* \* \* \*